(12) United States Patent
Hayashi

(10) Patent No.: US 8,050,447 B2
(45) Date of Patent: Nov. 1, 2011

(54) INFORMATION PROCESSING METHOD AND DEVICE, COMPUTER PROGRAM, AND COMPUTER-READABLE STORAGE MEDIUM

(75) Inventor: Junichi Hayashi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 982 days.

(21) Appl. No.: 11/720,958

(22) PCT Filed: Jan. 25, 2006

(86) PCT No.: PCT/JP2006/301603
§ 371 (c)(1),
(2), (4) Date: Jun. 6, 2007

(87) PCT Pub. No.: WO2006/085453
PCT Pub. Date: Aug. 17, 2006

(65) Prior Publication Data
US 2008/0175431 A1 Jul. 24, 2008

(30) Foreign Application Priority Data
Feb. 9, 2005 (JP) .................................. 2005-033016

(51) Int. Cl.
*G06K 9/00* (2006.01)
*G06K 9/54* (2006.01)
(52) U.S. Cl. ........................................ 382/100; 382/305
(58) Field of Classification Search .................. 382/100, 382/305, 115–119; 713/160–181; 380/200, 380/246, 252–255
See application file for complete search history.

(56) References Cited

U.S. PATENT DOCUMENTS

| 5,898,779 A | 4/1999 | Squilla et al. .................. 380/23 |
| 6,535,616 B1 | 3/2003 | Hayashi et al. |
| 6,741,758 B2 | 5/2004 | Hayashi et al. |
| 6,807,365 B1 | 10/2004 | Aoki ............................. 386/109 |
| 6,826,290 B1 | 11/2004 | Murakami et al. |
| 6,873,711 B1 | 3/2005 | Murakami et al. |
| 6,993,148 B1 | 1/2006 | Miyashita et al. |
| 7,006,257 B1 | 2/2006 | Yamazaki et al. |
| 7,006,660 B2 | 2/2006 | Hayashi |
| 7,142,689 B2 | 11/2006 | Hayashi et al. |

(Continued)

FOREIGN PATENT DOCUMENTS

EP 845758 6/1998

(Continued)

OTHER PUBLICATIONS

Supplemental European Search Report dated Oct. 11, 2010, issued in European Patent Application No. 06712746.4.

(Continued)

*Primary Examiner* — Ishrat I Sherali
(74) *Attorney, Agent, or Firm* — Fitzpatrick, Cella, Harper & Scinto

(57) ABSTRACT

A partial data acquisition unit acquires partial data included in digital data, a partial data specifying information acquisition unit acquires specifying information for the partial data, a combining unit combines the partial data and the specifying information, and a verification data generation unit generates verification data. Thus, it is possible to verify whether or not region data in image data has been altered. In addition, it is possible to verify that the region data is the region data in image data different from the original image data, and/or, it is possible to further verify that the region data is the different region data included in the original image data.

9 Claims, 15 Drawing Sheets

U.S. PATENT DOCUMENTS

| | | |
|---|---|---|
| 7,146,502 B2 | 12/2006 | Hayashi |
| 7,167,988 B2 | 1/2007 | Hayashi |
| 7,187,781 B2 | 3/2007 | Hayashi |
| 7,272,239 B2 | 9/2007 | Hayashi |
| 7,287,284 B2 | 10/2007 | Hayashi |
| 2001/0026377 A1* | 10/2001 | Ikegami ............... 358/401 |
| 2004/0081334 A1 | 4/2004 | Hayashi |
| 2004/0153674 A1 | 8/2004 | Hayashi |
| 2004/0177251 A1 | 9/2004 | Hayashi |
| 2004/0236951 A1 | 11/2004 | Zhao |
| 2005/0078820 A1 | 4/2005 | Hayashi |
| 2006/0020809 A1 | 1/2006 | Hayashi |
| 2006/0033942 A1 | 2/2006 | Yamazaki et al. |
| 2006/0080743 A1* | 4/2006 | Zhu et al. ............... 726/30 |
| 2006/0149762 A1 | 7/2006 | Suga et al. |
| 2006/0294385 A1 | 12/2006 | Hayashi |
| 2007/0127771 A1 | 6/2007 | Kaneda et al. |
| 2007/0150962 A1 | 6/2007 | Hayashi |

FOREIGN PATENT DOCUMENTS

| | | |
|---|---|---|
| EP | 1 056 043 | 10/2002 |
| JP | 2000-194832 | 7/2000 |
| JP | 2000-341632 | 12/2000 |
| JP | 2003-152979 | 5/2003 |
| KR | 1998-0041902 | 8/1998 |
| KR | 2003-0012487 | 2/2003 |

OTHER PUBLICATIONS

Official Communication dated Jul. 5, 2011, from the European Patent Office, issued in European Patent Application No. 06712746.4.

* cited by examiner

| ID | Z | M |
|---|---|---|

FIG. 15

```
DOCUMENT DATA DISCRIMINATION
INFORMATION ID
<COMPANY INFORMATION>
 <COMPANY NAME>XXX</COMPANY NAME>

<COMPANY INFORMATION>
 <COMPANY NAME>YYY</COMPANY NAME>

<COMPANY MEMBER INFORMATION>
 <COMPANY MEMBER NUMBER>00001</COMPANY MEMBER NUMBER>
 <NAME>AAA</NAME>
 <SEXUALITY>MALE</SEXUALITY>
 <IN CHARGE OF>BUSINESS SECTION</IN CHARGE OF>
</COMPANY MEMBER INFORMATION>

<COMPANY MEMBER INFORMATION>
 <COMPANY MEMBER NUMBER>00001</COMPANY MEMBER NUMBER>
 <NAME>CCC</NAME>
 <SEXUALITY>MALE</SEXUALITY>
 <IN CHARGE OF>CLERICAL WORK SECTION</IN CHARGE OF>
</COMPANY MEMBER INFORMATION>

PARTIAL DATA
                                            SPECIFYING INFORMATION Z
<COMPANY MEMBER INFORMATION>
 <COMPANY MEMBER NUMBER>00002</COMPANY MEMBER NUMBER>
 <NAME>BBB</NAME>
 <SEXUALITY>FEMALE</SEXUALITY>
 <IN CHARGE OF>DEVELOPMENT SECTION</IN CHARGE OF>
</COMPANY MEMBER INFORMATION>

<COMPANY MEMBER INFORMATION>
 <COMPANY MEMBER NUMBER>00002</COMPANY MEMBER NUMBER>
 <NAME>DDD</NAME>
 <SEXUALITY>FEMALE</SEXUALITY>
 <IN CHARGE OF>BUSINESS SECTION</IN CHARGE OF>
</COMPANY MEMBER INFORMATION>
</COMPANY INFORMATION>
                    PARTIAL DATA M
</COMPANY INFORMATION>
```

FIG. 16A

DATABASE INFORMATION DISCRIMINATION INFORMATION ID

COMPANY NAME XXX — PARTIAL DATA M

| RECORD NUMBER | COMPANY MEMBER NUMBER | NAME | SEXUALITY | IN CHARGE OF |
|---|---|---|---|---|
| 1 | 000001 | AAA | MALE | BUSINESS SECTION |
| 2 | 000002 | BBB | FEMALE | DEVELOPMENT SECTION |
| ... | ... | ... | ... | ... |

PARTIAL DATA SPECIFYING INFORMATION Z

COMPANY NAME YYY

| RECORD NUMBER | COMPANY MEMBER NUMBER | NAME | SEXUALITY | IN CHARGE OF |
|---|---|---|---|---|
| 1 | 000001 | CCC | MALE | CLERICAL WORK SECTION |
| 2 | 000002 | DDD | FEMALE | BUSINESS SECTION |
| ... | ... | ... | ... | ... |

FIG. 16B

DATABASE DISCRIMINATION INFORMATION ID

COMPANY NAME XXX    URL :www.xxxcompany.com    PARTIAL DATA M

| RECORD NUMBER | COMPANY MEMBER NUMBER | NAME | SEXUALITY | IN CHARGE OF |
|---|---|---|---|---|
| 1 | 000001 | AAA | MALE | BUSINESS SECTION |
| 2 | 000002 | BBB | FEMALE | DEVELOPMENT SECTION |
| ... | ... | ... | ... | ... |

PARTIAL DATA SPECIFYING INFORMATION Z

COMPANY NAME YYY

| RECORD NUMBER | COMPANY MEMBER NUMBER | NAME | SEXUALITY | IN CHARGE OF |
|---|---|---|---|---|
| 1 | 000001 | CCC | MALE | CLERICAL WORK SECTION |
| 2 | 000002 | DDD | FEMALE | BUSINESS SECTION |
| ... | ... | ... | ... | ... |

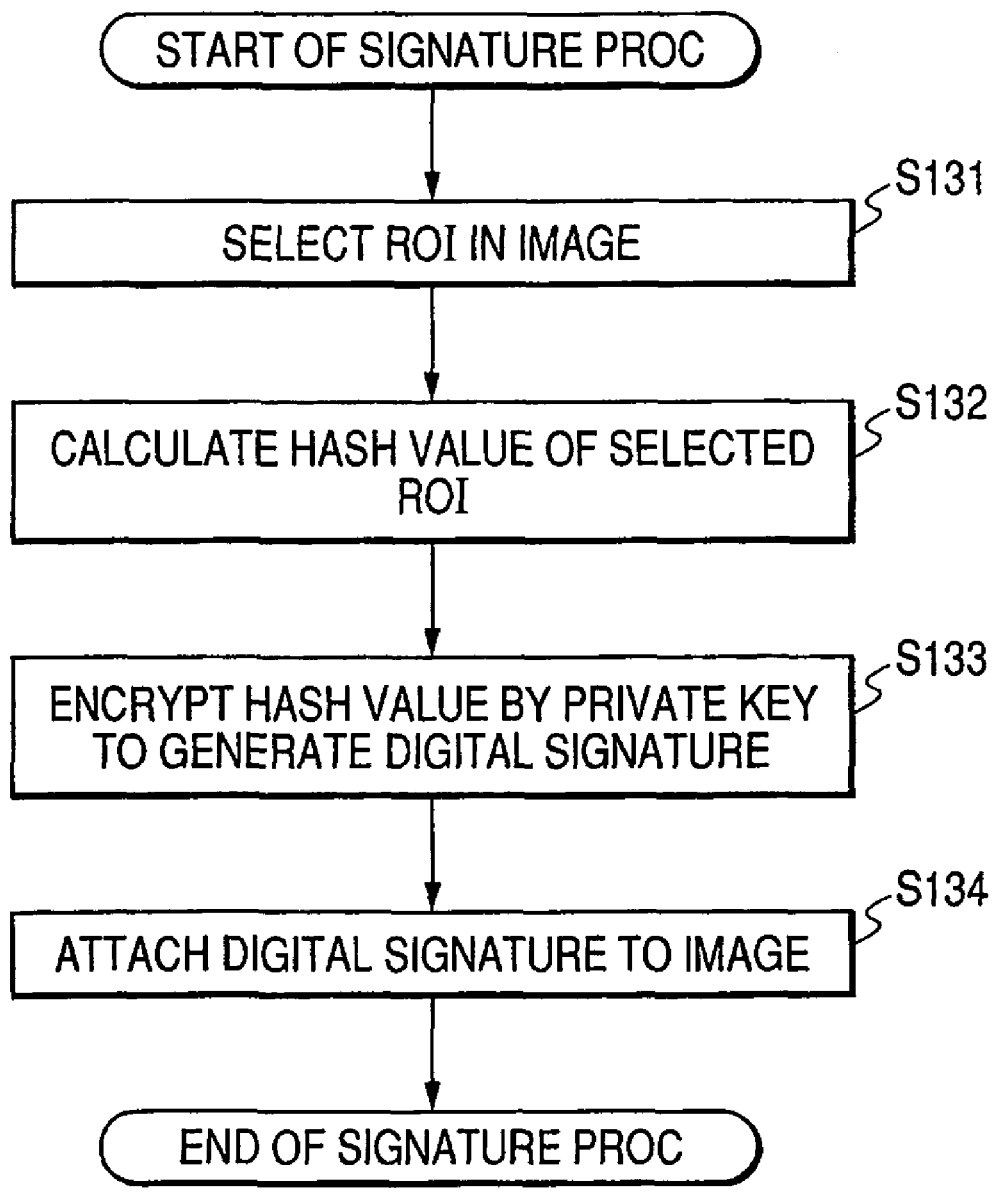

ly, in the signature method proposed in U.S. Pat. No. 5,898,779 for a digital image, as shown in FIG. 17, an ROI (region of interest) of the relevant image is first selected (step S131), the hash value (i.e., the message digest) of the selected ROI is calculated (step S132), the calculated hash value is encrypted by a private key to generate a digital signature (step S133), and the generated digital signature is attached to the relevant image (step S134).

INFORMATION PROCESSING METHOD AND DEVICE, COMPUTER PROGRAM, AND COMPUTER-READABLE STORAGE MEDIUM

TECHNICAL FIELD

The present invention relates to an information processing method and device for verifying or authenticating digital data or generating verification data, a computer program for executing the information processing method, and a computer-readable storage medium for storing the computer program.

BACKGROUND ART

Conventionally, a signature method which aims to verify whether or not partial region data (not whole image data) has been altered is proposed in, for example, U.S. Pat. No. 5,898,779. More specifically, in the signature method proposed in U.S. Pat. No. 5,898,779 for a digital image, as shown in FIG. 17, an ROI (region of interest) of the relevant image is first selected (step S131), the hash value (i.e., the message digest) of the selected ROI is calculated (step S132), the calculated hash value is encrypted by a private key to generate a digital signature (step S133), and the generated digital signature is attached to the relevant image (step S134).

Thus, according to such a conventional technique, it is possible to verify whether or not the region data in the original image data has been altered. However, it is difficult in the conventional technique to verify whether or not the relationship between the region data and the original image data is correct. For example, it is difficult to verify whether or not the region data is the partial image data existing in the original image data, and it is also difficult to verify whether or not the partial image data is the region data at the correct location in the original image data. That is, even if the partial image data including the digital signature is falsely added to original image data that is quite different from the authentic original image data, it is impossible to detect such alteration. Moreover, even if the partial image data is falsely replaced by different region data in the authentic original image data, it is impossible to detect such alteration if the digital signature of the relevant different region data exists.

DISCLOSURE OF THE INVENTION

The present invention is completed in consideration of such conventional problems as above, and an object thereof is to provide a technique capable of verifying whether or not region data in image data has been altered, and, in addition, capable of verifying that the region data is region data in original image data different from authentic original image data and/or verifying that the region data is different region data in the authentic original image data.

In order to solve the above conventional problems, an information processing method, according to the present invention, which generates verification data for verifying partial completeness of digital data is characterized by comprising:

a partial data acquisition step of acquiring partial data included in the digital data;

a discrimination information acquisition step of acquiring at least one of discrimination information of the digital data and specifying information of the partial data; and a verification data generation step of generating the verification data according to at least one of the discrimination information of the digital data and the specifying information of the partial data, and the partial data.

Moreover, in order to solve the above conventional problems, an information processing method, according to the present invention, which verifies partial completeness of digital data by using verification data generated according to at least one of discrimination information of the digital data and specifying information of partial data, and the partial data, is characterized by comprising:

a verification data acquisition step of acquiring verification data;

a partial data acquisition step of acquiring the partial data included in the digital data;

a discrimination information acquisition step of acquiring at least one of the discrimination information of the digital data and the specifying information of the partial data;

a verification data generation step of generating the verification data according to at least one of the discrimination information of the digital data and the specifying information of the partial data, and the partial data; and a verification step of verifying whether or not relation between the partial data and the digital data is correct, by using the verification data acquired in the verification data acquisition step and the verification data generated in the verification data generation step.

Other objects, features and advantages of the present invention will become apparent from the following detailed description taken in conjunction with the accompanying drawings.

BRIEF DESCRIPTION OF THE DRAWINGS

FIG. 15 is a diagram for explaining document data in the embodiment;

FIGS. 16A and 16B are diagrams for explaining database information in the embodiment; and FIG. 17 is a flow chart showing the signature process in the background art.

BEST MODE FOR CARRYING OUT THE INVENTION

Hereinafter, the preferred embodiment of the present invention will be explained with reference to the attached drawings.

<Explanation of Whole Constitution>

Figure 1:
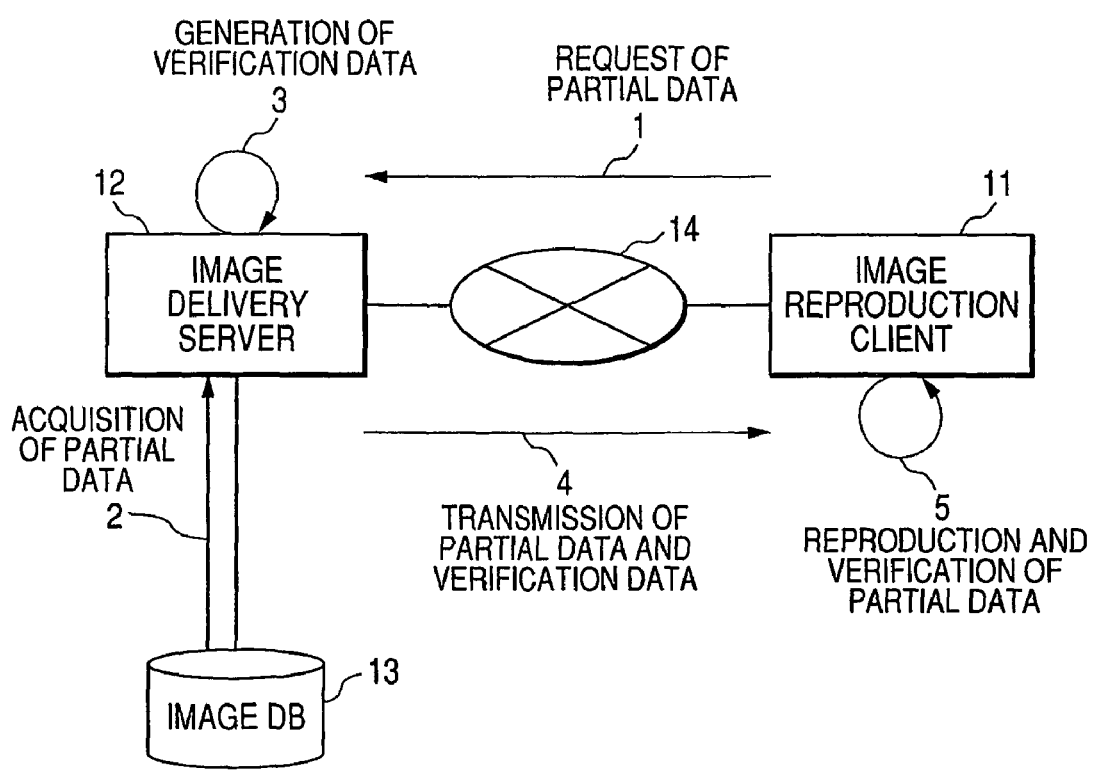
FIG. 1 is a diagram showing the whole constitution of a system in the embodiment of the present invention.

First of all, an example of the system outline according to the embodiment of the present invention is shown in FIG. 1. Here, in the system according to the embodiment consists of an image reproduction client 11, an image delivery server 12, an image DB (database) 13 and a network 14.

In FIG. 1, the image reproduction client 11 transmits a request for acquiring desired image data to the image delivery server 12, and then reproduces the image data delivered from the image delivery server 12 through the network 14. Moreover, in the embodiment, the image reproduction client 11 receives, in addition to the image data, verification data corresponding to the relevant image data, and thus verifies whether or not the received image data has been altered.

The image delivery server 12 delivers the image data stored in the image DB 13, in response to the request for acquiring the image data received from the image reproduction client 11. In the embodiment, the image delivery server 12 generates, in addition to the image data, the verification data by which it is possible on the side of the image reproduction client 11 to verify whether or not the relevant image data has been altered, and then the image delivery server 12 transmits the generated verification data to the image reproduction client 11.

The image reproduction client 11 and the image delivery server 12 are mutually connected to each other through the network 14 such as the Internet or the like, whereby various data can be exchanged between the image reproduction client 11 and the image delivery server 12. Here, it should be noted that each of the image reproduction client 11 and the image delivery server 12 may be a multipurpose device such as an ordinary personal computer or the like. In any case, the flow of the process to be executed in the system will be briefly explained hereinafter.

A user who browses the images in the system first requests the desired image data to the image delivery server 12 by using the image reproduction client 11. At that time, the user can designate and request partial image data, i.e., not whole image data ("request of partial data" 1 in FIG. 1).

Then, the image delivery server 12 acquires from the image DB 13 the partial image data requested form the image reproduction client 11 ("acquisition of partial data" 2 in FIG. 1), and generates the verification data corresponding to the acquired partial image data ("generation of verification data" 3 in FIG. 1). Subsequently, the image delivery server 12 transmits the acquired partial image data and the generated verification data to the image reproduction client 11 ("transmission of partial data and verification data" 4 in FIG. 1).

Subsequently, the image reproduction client 11 receives the partial image data and the verification data, verifies based on the verification data whether or not the received partial image data is correct partial image data, and then displays the verification result ("reproduction and verification of partial data" 5 in FIG. 1).

The above is the example of the system outline according to the embodiment.

In such an image delivery system as explained above, the request for the partial image data, the image data verification process and an example of the operation screen (window) for the image data reproduction process will be explained hereinafter with reference to FIG. 2.

Figure 2:
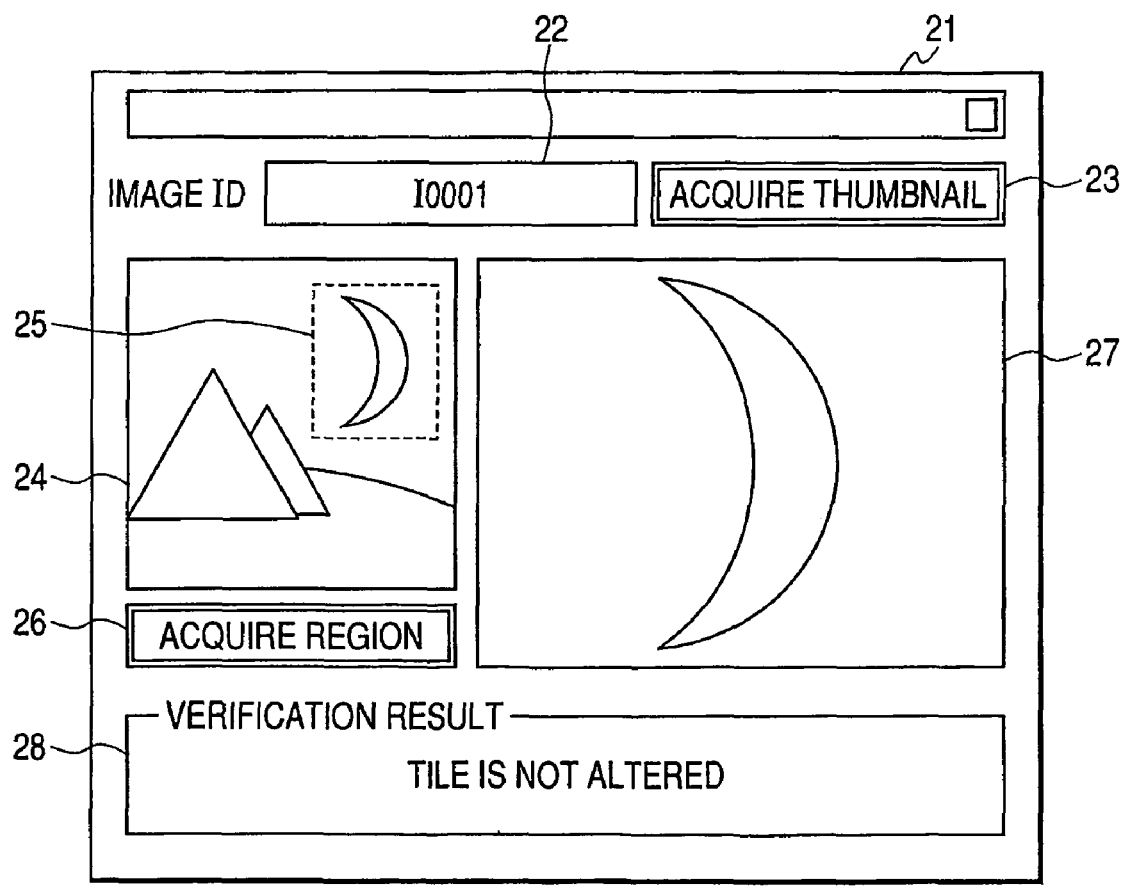
FIG. 2 is a diagram showing an example of a GUI (graphical user interface) which is applicable in an image reproduction client in the embodiment.

In FIG. 2, a section 22 to be used for designating "image ID" of the desired image data is provided at the top of a window 21. On the section 22, the user designates the image ID by directly inputting it through a not-shown keyboard or the like. Besides, a button 23 to be used for acquiring the thumbnail of the image ID designated through the section 22 and displaying the acquired thumbnail is provided at the right of the section 22.

By clicking the button 23 with use of a not-shown mouse or the like, the thumbnail of the image data corresponding to the image ID designated through the section 22 is displayed on a thumbnail viewer 24.

After the thumbnail was displayed, the user can freely select a desired region 25 in the thumbnail by using the mouse or the like. A button 26 to be used for displaying the detailed information of the designated desired region 25 is provided below the thumbnail viewer 24. In the state that the desired region 25 is being selected, if the user clicks the button 26 by using the mouse or the like, the detail of the partial image data designated by the region 25 is displayed on an image viewer 27. In addition, the result of the verification process indicating whether or not the partial image data displayed on the image viewer 27 is the correct data is displayed on a section 28.

That is, it is easily understandable that, by clicking the button 26, the series of processes "request of partial data" 1, "acquisition of partial data" 2, "generation of verification data" 3, "transmission of partial data and verification data" 4 and "reproduction and verification of partial data" 5 all shown in FIG. 1 is automatically executed.

Incidentally, it should be noted that the window illustrated in FIG. 2 is equivalent to one example which is applicable to the present invention, that is, it is apparent that the present invention is not limited to this.

Figure 3:
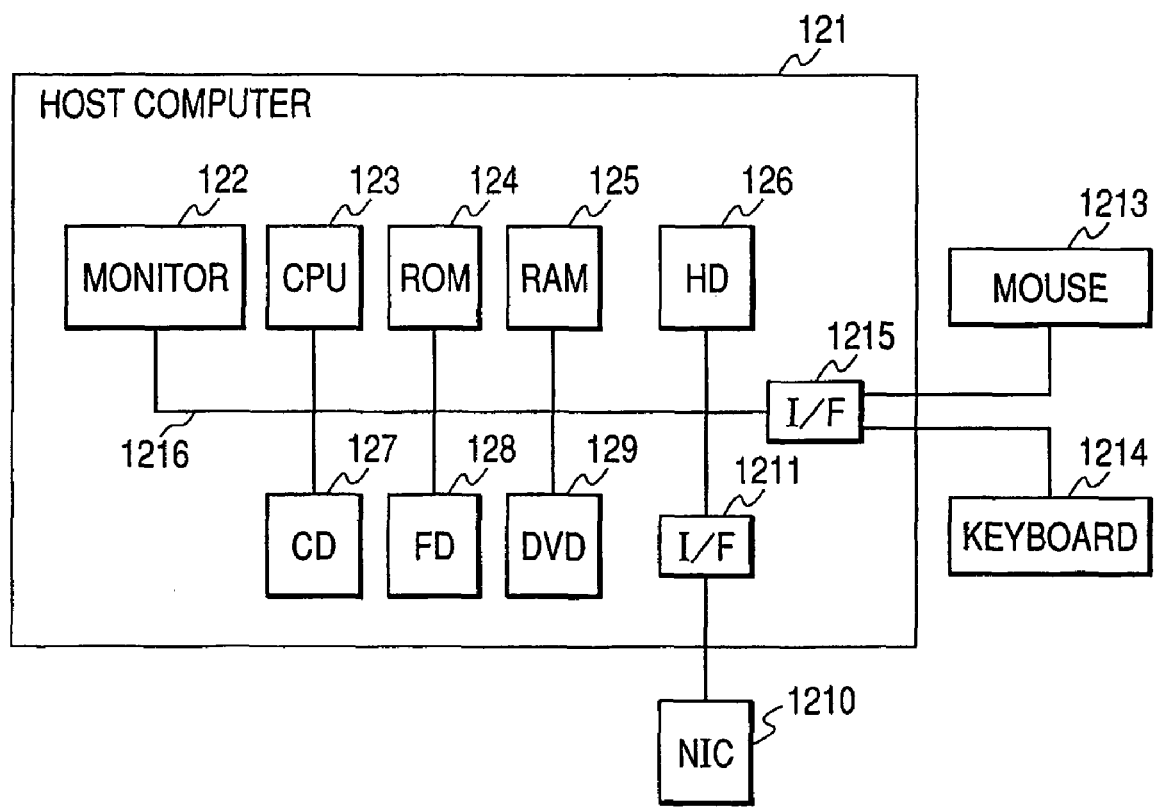
FIG. 3 is a block diagram showing a host computer in the embodiment.

Subsequently, the host computer which is applicable to the embodiment of the present invention will be explained hereinafter with reference to FIG. 3. That is, FIG. 3 shows the basic constitution of the host computer which can function as either the image reproduction client or the image delivery server, and also shows the relation of these devices and their peripheral devices. In FIG. 3, a host computer 121 is, for example, a personal computer which is in widespread use. The host computer 121 can store the image data in an HD (hard disk) 126, a CD (compact disk) 127, an FD (Floppy™ disk) 128, a DVD (digital versatile disk) 129 and the like, and can also display the image data stored in the HD 126, the CD 127, the FD 128, the DVD 129 and the like. Further, the host computer 121 can deliver the image data through the Internet or the like by using an NIC (network interface card) 1210 or the like. On one hand, the various indications and the like from the user are input through a mouse 1213 and a keyboard 1214. In the host computer 121, the later-described functional blocks are mutually connected through a bus 1216 so as to be able to exchange the various data.

In FIG. 3, numeral 122 denotes a monitor which can display various information in the host computer 121.

Numeral 123 denotes a CPU (central processing unit) which can control the operation of each unit in the host computer 121 and can also execute the programs loaded in a RAM (random access memory) 125. Numeral 124 denotes a ROM (read only memory) in which the BIOS (Basic Input/Output System) and the boot program have been stored. Numeral 125 denotes the RAM in which the program and the process-target image data are temporarily stored for the purpose of processes by the CPU 123. Besides, the OS (operating system) and the programs for causing the CPU 123 to execute the later-described processes are loaded in the RAM 125.

Numeral 126 denotes the HD in which the OS and the programs to be transferred to the RAM or the like are stored. Further, the HD 126 is used to store and read the image data while the device is operating. The CD 127 is equivalent to the CD-ROM drive which can read and write various data from and to a CD-ROM (CD-R) being one of external storage media. In this connection, it should be noted that the CD 127 is also called the CD-ROM drive 127 hereinafter.

As well as the CD-ROM drive 127, the FD 128 which is equivalent to the FD drive 128 can read and write the data from and to the Floppy™ disk. In this connection, it should be noted that the FD 128 is also called the FD drive 128 hereinafter. Moreover, as well as the CD-ROM drive 127, the DVD 129 which is equivalent to the DVD-ROM (DVD-RAM) drive 128 can read the data from the DVD-ROM and can write the data to the DVD-RAM. In this connection, it should be noted that the DVD 129 is also called the DVD-ROM drive or the DVD-RAM drive hereinafter. Incidentally, in a case where the image processing program is stored in the CD-ROM, the FD, the DVD-ROM or the like, the relevant program is once installed in the HD 126 and then transferred to the RAM 125 according to need.

Numeral 1211 denotes an I/F (interface) which connects the host computer 121 to the NIC 1210 for exchanging the image data store in the RAM 125, the HD 126, the CD-ROM 127, the FD 128, the DVD 129 or the like with the network such as the Internet or the like. Thus, the host computer 121 can transmit and receive the data to and from the Internet through the I/F 1211.

Numeral 1215 denotes an I/F which connects the mouse 1213 and the keyboard 1214 to the host computer 121. Thus, the various indications and data input from the mouse 1213 and the keyboard 1214 are transferred to the CPU 123 through the I/F 1215.

<Verification Data Generation Process>

Subsequently, the verification data generation processing unit and the verification data generation method which are applicable to the embodiment of the present invention will be explained with reference to FIG. 4.

Figure 4:
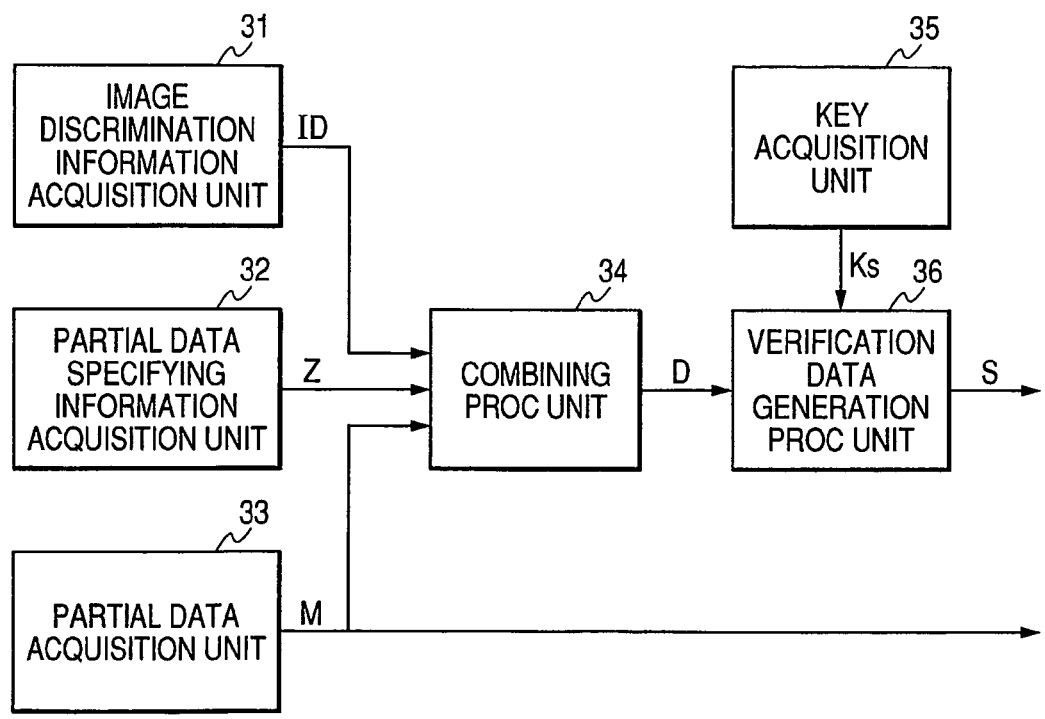
FIG. 4 is a block diagram showing the constitution of a verification data generation processing unit in the embodiment.

That is, FIG. 4 shows the verification data generation processing function and the verification data generation method according to the embodiment. In FIG. 4, numeral 31 denotes an image discrimination information acquisition unit, numeral 32 denotes a partial data specifying information acquisition unit, numeral 33 denotes a partial data acquisition unit, numeral 34 denotes a combining processing unit, numeral 35 denotes a key acquisition unit, and numeral 36 denotes a verification data generation processing unit.

Here, it should be noted that the verification data generation processing function shown in FIG. 4 is one function included in the image delivery server 12 shown in FIG. 1.

In any case, the image discrimination information acquisition unit 31 and the partial data specifying information acquisition unit 32 will be first explained. That is, the image discrimination information acquisition unit 31 acquires and outputs image discrimination information ID requested from the image reproduction client 11, and also the partial data specifying information acquisition unit 32 acquires and outputs partial data specifying information Z requested from the image reproduction client 11.

Here, it should be noted that the image discrimination information ID is the information for specifying the image data, and the partial data specifying information Z is the information for specifying the partial data in the relevant image data.

In the embodiment, the file name of the image data is used as the image discrimination information ID by way of example. However, the present invention is not limited to this. In other words, it is apparent that the URL (Uniform Resource Locater) of indicating the location of the image data, the URI (Uniform Resource Identifier) of uniquely discriminating the image data, the hash value of the image data, and the like are also applicable as the image discrimination information ID.

Moreover, in the embodiment, the partial rectangular region such as the region 25 of FIG. 2 included in the image data is used as the partial data. In this connection, if the rectangular region is used as the partial data, the upper left coordinate information (x1, y1) and the lower right coordinate information (x2, y2) of the rectangular region can be used as the partial data specifying information Z.

Incidentally, the present invention is not limited to the above. That is, it is apparent that, in addition to the rectangular region, various partial data specifying information capable of specifying the region is applicable.

Figures 5, 6:
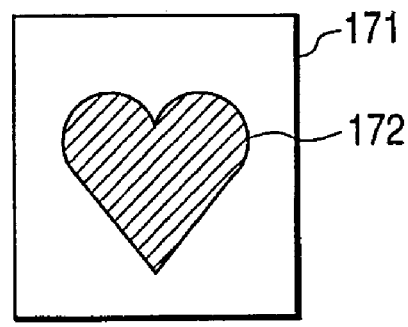
FIG. 5 is a diagram for explaining partial data specifying information in the embodiment.
FIG. 6 is a diagram for explaining combination data in the embodiment.

More specifically, if an arbitrary-shaped region is designated as the partial data, the binary image data in which the pixel corresponding to the location designated as the partial data is set to "0" and the pixel corresponding to the location not designated as the partial data is set to "1" can be used as the partial data specifying information Z. For example, as shown in FIG. 5, the binary image in which the outside of a heart (171) is set to "0" and the inside of the heart (172) is set to "1" is applicable as the partial data specifying information Z.

Moreover, in a case where the image data is divided into plural tiles which do not overlap respectively, a tile index which discriminates the tiles can be used as the partial data specifying information Z.

In any case, it should be noted that various information capable of uniquely specifying the partial data is applicable as the partial data specifying information.

Next, the partial data acquisition unit 33 will be explained hereinafter. The partial data acquisition unit 33 acquires from the image DB 31 partial data M corresponding to the image discrimination information ID acquired by the image discrimination information acquisition unit 31 and the partial data specifying information Z acquired by the partial data specifying information acquisition unit 32, and then outputs the acquired partial data M.

As described above, in the embodiment, the data of the partial rectangular region in the image data is output as the partial data M.

Next, the combining processing unit 34 will be explained hereinafter. That is, the image discrimination information ID output from the image discrimination information acquisition unit 31, the partial data specifying information Z output from the partial data specifying information acquisition unit 32 and the partial data M output from the partial data acquisition unit 33 are input to the combining processing unit 34, the input data are combined in the combining processing unit 34, and combination data D is then output.

Here, the combination data D in the embodiment will be explained with reference to FIG. 6. As shown in FIG. 6, in the embodiment, the image discrimination information ID, the partial data specifying information Z and the partial data M are combined in predetermined order to generate the combination data D. Here, it is needless to say that the order for combining the data is not limited to that shown in FIG. 6.

Next, the key acquisition unit 35 will be explained hereinafter. That is, the key acquisition unit 35 acquires and outputs key information Ks necessary for the verification data generation process to be performed by the verification data generation processing unit 36.

Incidentally, the detail of the key information Ks in the embodiment will be explained later.

Subsequently, the verification data generation processing unit 36 will be explained hereinafter. That is, the combination data D output from the combining processing unit 34 and the key information Ks output from the key acquisition unit 35 are input to the verification data generation processing unit 36, verification data S corresponding to the combination data D is thus generated by using the key information Ks in the verification data generation processing unit 36, and the generated verification data S is output.

In the embodiment, the verification data generation process is not specifically mentioned. That is, various verification data generation processes such as the digital signature generation algorithms such as the RSA (Rivest Shamir Adleman) algorithm, the DSA (digital signature algorithm) and the like, and the MAC (message authentication) generation algorithm such as the HMAC (hash-based MAC) generation algorithm, the CMAC (cipher-based MAC) generation algorithm and the like are applicable. Incidentally, it is assumed that, if the digital signature generation algorithm is used as the verification data generation process, the key information Ks acquired by the key acquisition unit 35 is used as the private key of the image delivery server 12. Moreover, it is assumed that, if the MAC generation algorithm is used, the key information Ks is the shared key which is securely shared by the image reproduction client 11 and the image delivery server 12.

Incidentally, before the verification data generation process is executed to the combination data D, the verification data generation process can be applied to the output value of the hash function by applying the hash function such as MD (Message Digest) 5, SHA (Secure Hash Algorithm) 1 or the like to the combination data D.

The verification data generation process and the verification data generation method in the embodiment have been explained.

Figure 7:
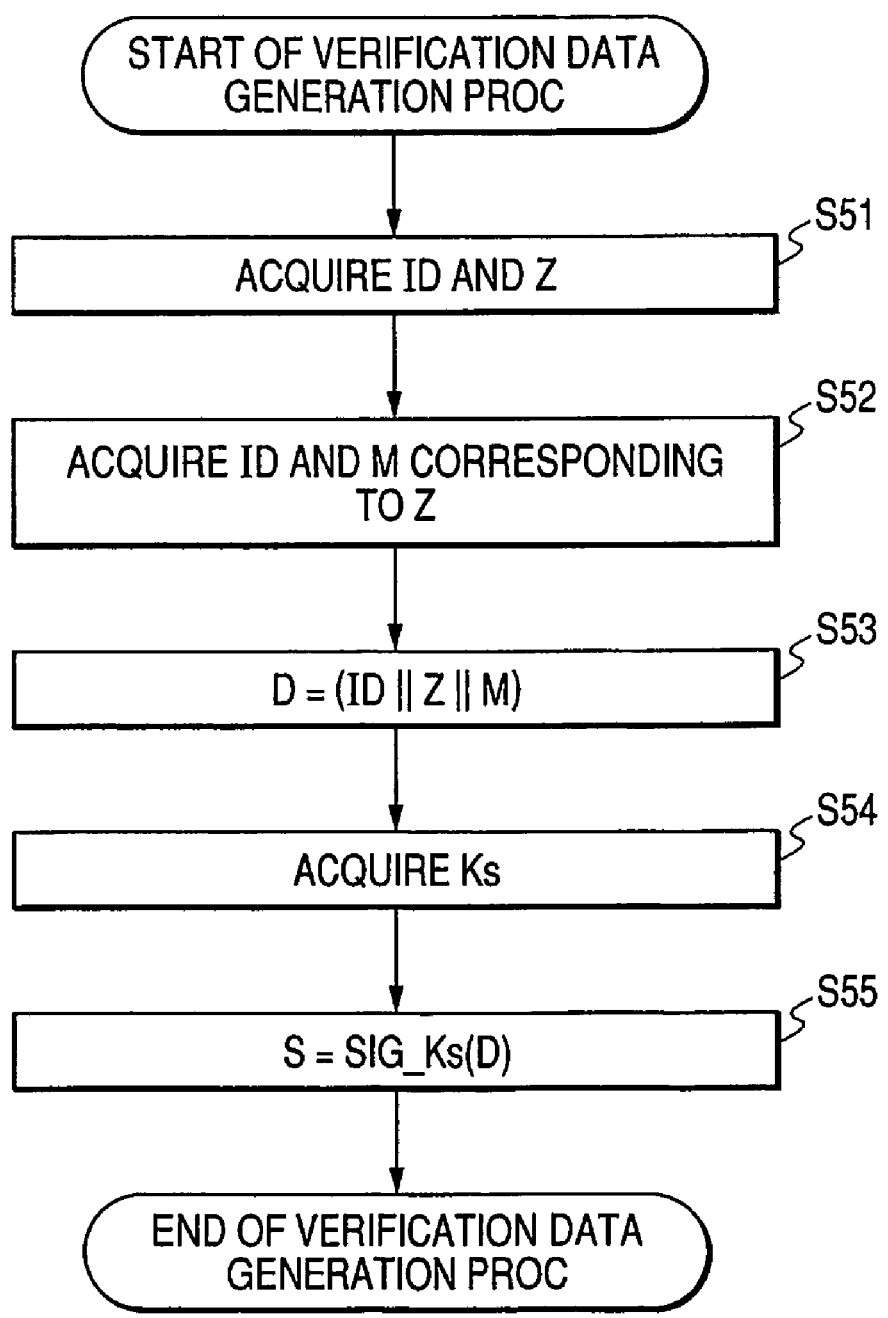
FIG. 7 is a flow chart of a verification data generation process in the embodiment.

Subsequently, the flow of the verification data generation process explained as above will be explained with reference to a flow chart shown in FIG. 7. That is, FIG. 7 is the flow chart for explaining the verification data generation process applicable to the embodiment.

Initially, in a step S51, the image discrimination information ID and the partial data specifying information Z are acquired respectively by the image discrimination information acquisition unit 31 and the partial data specifying information acquisition unit 32 both shown in FIG. 4. Then, in a step S52, the partial data M corresponding to the image discrimination information ID and the partial data specifying information Z is acquired by the partial data acquisition unit 33 shown in FIG. 4. Subsequently, in a step S53, the image discrimination information ID, the partial data specifying information Z and the partial data M are combined by the combining processing unit 34 shown in FIG. 4 to generate the combination data D. After then, the key information Ks for generating the verification data is acquired in a step S54, the verification data S for the combination data D is then generated by using the key information Ks in a step S55, and the verification data generation process ends.

<Verification Process and Method>

Figure 8:
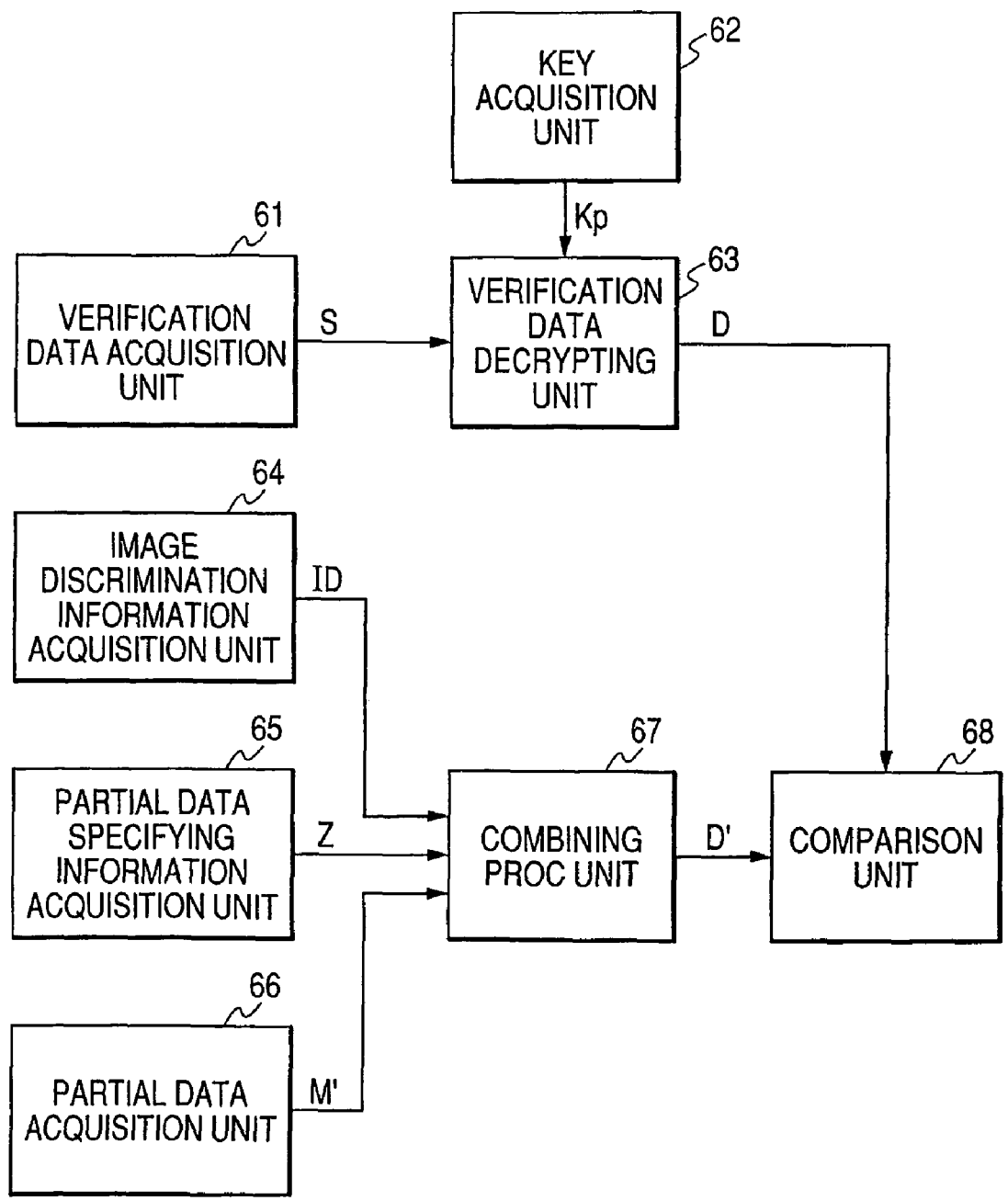
FIG. 8 is a block diagram for explaining the configuration of a verification processing unit in the embodiment.

Next, the verification process and method applicable to the embodiment will be explained with reference to FIG. 8. In FIG. 8, numeral 61 denotes a verification data acquisition unit, numeral 62 denotes a key acquisition unit, numeral 63 denotes a verification data decrypting unit, numeral 64 denotes an image discrimination information acquisition unit, numeral 65 denotes a partial data specifying information acquisition unit, numeral 66 denotes a partial data acquisition unit, numeral 67 denotes a combining processing unit, and numeral 68 denotes a comparison unit.

Here, it should be noted that the verification processing function shown in FIG. 8 is one function included in the image reproduction client 11 shown in FIG. 1.

In any case, the verification data acquisition unit 61 will be first explained. That is, the verification data acquisition unit 61 acquires and outputs the verification data S transmitted from the image delivery server 12. Incidentally, it is easily understandable that the verification data S acquired here is the data output from the verification data generation processing unit 35 shown in FIG. 4.

Next, the key acquisition unit 62 will be explained. That is, the key acquisition unit 62 acquires and outputs key information Kp necessary for the verification data decrypting process to be executed in the verification data decrypting unit 63.

Here, it should be noted that the key information Kp acquired by the key acquisition unit 62 is the information substantially corresponding to the key information Ks acquired by the key acquisition unit 35 shown in FIG. 4. That is, if the private key of the image delivery server 12 is acquired as the key information Ks by the key acquisition unit 35, the public key of the image delivery server 12 which makes a pair with the key information Ks is acquired as the key information Kp by the key acquisition unit 62. On the other hand, if the shared key is acquired as the key information Ks by the key acquisition unit 35, the value equivalent to the key information Ks is acquired as the key information Kp by the key acquisition unit 62.

Next, the verification data decrypting unit 63 will be explained. That is, the verification data S acquired by the verification data acquisition unit 61 and the key information Kp acquired by the key acquisition unit 62 are input to the verification data decrypting unit 63, the input verification data S is decrypted by using the key information Kp, and a decrypted value D is output from the verification data decrypting unit 63.

Here, it should be noted that the process corresponding to the verification data generation process executed by the verification data generation processing unit 36 shown in FIG. 4 is applied to the verification data decrypting process to be executed by the verification data decrypting unit 63.

Particularly, if the MAC data is used as the verification data, it is possible not to execute the verification data decrypting process. In that case, the same value as the input verification data S is output as the decrypted value D.

Subsequently, the image discrimination information acquisition unit 64 and the partial data specifying information acquisition unit 65 will be explained. That is, the image discrimination information acquisition unit 64 acquires and outputs the image data corresponding to the partial data acquired by the partial data acquisition unit 66, and the partial data specifying information acquisition unit 65 acquires and outputs the information for specifying the partial data.

Incidentally, it should be noted that, in FIG. 8, the image discrimination information ID is the information substantially equivalent to the image discrimination information ID acquired by the image discrimination information acquisition unit 31 shown in FIG. 4 and the partial data specifying information Z is the information substantially equivalent to the partial data specifying information Z acquired by the partial data specifying information acquisition unit 32 shown in FIG. 4. In the embodiment, before the partial data request process is executed, the image discrimination information and the partial data specifying information respectively designated by the section 22 and the region 25 both shown in FIG. 2 are previously stored in the RAM 125 (FIG. 3), and then the image discrimination information ID and the partial data specifying information Z stored in the RAM 125 are acquired at the stage of the verification process.

It should be noted that the present invention is not limited to the above. That is, the combination data D (FIG. 6) can be delivered from the image delivery server 12 to the image reproduction client 11, and the image discrimination information ID and the partial data specifying information Z in the received combination data D can be acquired respectively by the image discrimination information acquisition unit 64 and the partial data specifying information acquisition unit 65. In that case, in a case where the image discrimination information ID and the partial data specifying information Z respectively designated at the time of requesting the partial data are respectively compared with the acquired image discrimination information ID and the acquired partial data specifying information Z, if coincidence is not acquired, then it is possible to judge that received partial data M' is not correct and thus to stop the process.

Next, the partial data acquisition unit 66 will be explained. The partial data acquisition unit 66 acquires and outputs the partial data M' delivered from the image delivery server 12. Incidentally, it is easily understandable that the partial data M' acquired here is the data output from the partial data acquisition unit 33 shown in FIG. 4.

Next, the combining processing unit 67 will be explained. That is, the image discrimination information ID acquired by the image discrimination information acquisition unit 64, the partial data specifying information Z acquired by the partial data specifying information acquisition unit 65 and the partial data M' acquired by the partial data acquisition unit 66 are input to the combining processing unit 67, the input data are combined in the combining processing unit 67, and combination data D' is then output.

Here, the combination data D' is generated by combining the image discrimination information ID, the partial data specifying information Z and the partial data M' respectively acquired by the image discrimination information acquisition unit 64, the partial data specifying information acquisition unit 65 and the partial data acquisition unit 66, substantially in the same manner as that executed by the combining processing unit 34 shown in FIG. 4.

Incidentally, as described above, if the hash function is applied to the verification data generation processing unit 36 (FIG. 4), after the combination data D' is generated by the combining processing unit 67, the hash function same as the hash function applied in the verification data generation processing unit 36 is applied to the generated combination data D' to output the hash value. Of course, it is possible to thereafter encrypt the hash value by using the private key and generate the digital signature.

Further, in a case where the MAC data is used as the verification data, the MAC data of the combination data D (or the hash value thereof) is generated by using the key information Kp acquired by the key acquisition unit 62, and the generated MAC data is output.

Next, the comparison unit 68 will be explained. The comparison unit 68 compares the combination data D output from the verification data decrypting unit 63 with the combination data D' output from the combining processing unit 67, and then outputs the verification result.

In the embodiment, if the value of the combination data D and the value of the combination data D' conform to each other, it is judged that the partial data M' is the correct data (success in verification). Meanwhile, if the value of the combination data D and the value of the combination data D' are different from each other, it is judged that the partial data M' is not the correct data (failure in verification).

Thus, the verification process and method in the embodiment have been explained as above.

Figure 9:
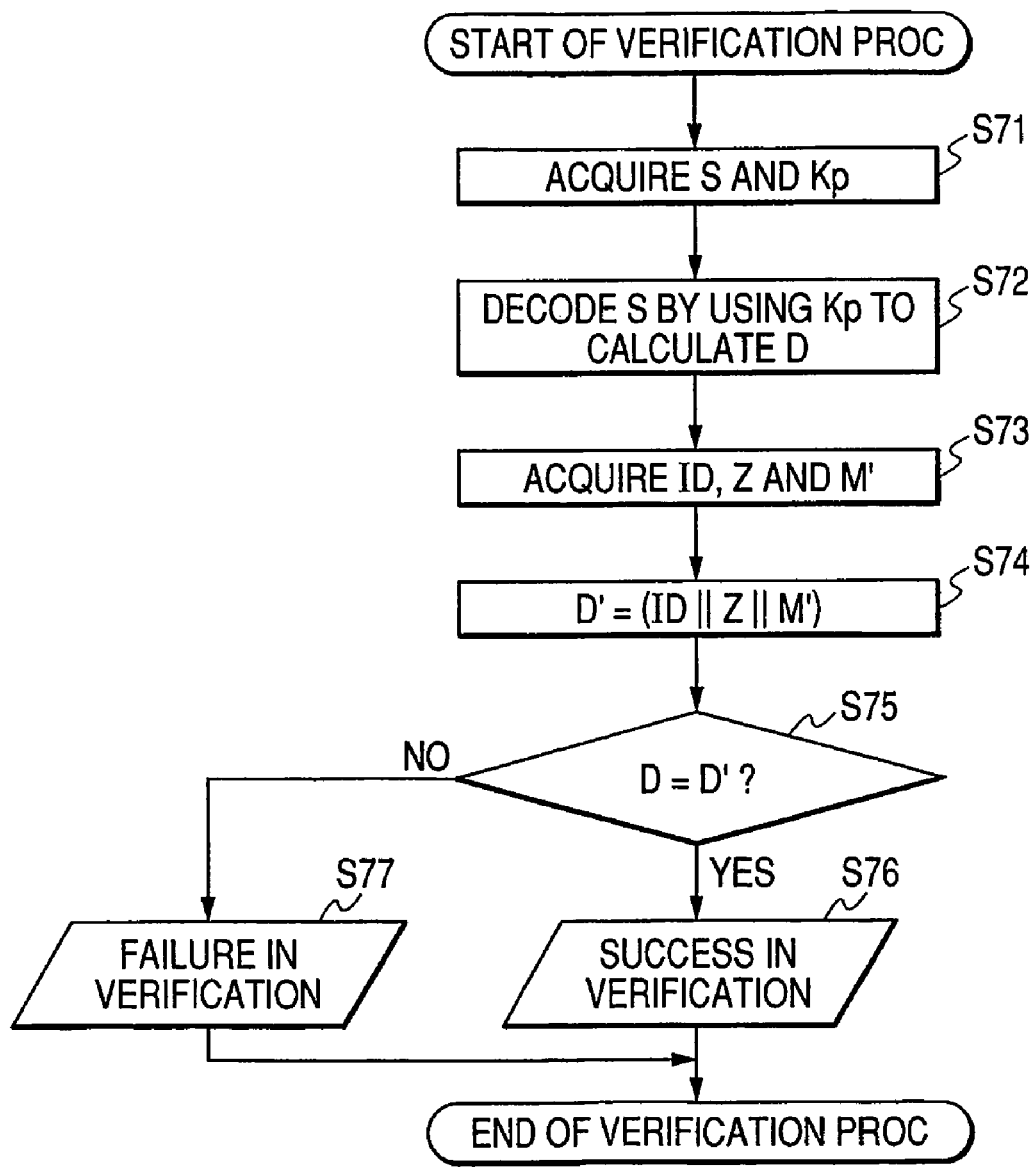
FIG. 9 is a flow chart of a verification process in the embodiment.

Subsequently, the flow of verification data generation process (method) as explained above will be explained with reference to a flow chart shown in FIG. 9. That is, FIG. 9 is the flow chart for explaining the verification data generation process applicable to the embodiment.

Initially, in a step S71, the verification data S and the key information Kp are acquired respectively by the verification data acquisition unit 61 and the key acquisition unit 62 both shown in FIG. 8. Next, in a step S72, the verification data S is decrypted by using the key information Kp to calculate the combination data D by the verification data decrypting unit 63 shown in FIG. 8. Further, in a step S73, the image discrimination information ID, the partial data specifying information Z and the partial data M' are acquired respectively by the image discrimination information acquisition unit 64, the partial data specifying information acquisition unit 65 and the partial data acquisition unit 66 all shown in FIG. 8. Next, in a step S74, the image discrimination information ID, the partial data specifying information Z and the partial data M' are combined to generate the combination data D' by the combining processing unit 67 shown in FIG. 8. After then, in a step S75, it is judged whether or not the combination data D conforms to the combination data D'. If it is judged that the combination data D conforms to the combination data D', the message "partial data M' is correct data (success in verification)" is displayed in a step S76. Meanwhile, if it is judged that the combination data D does not conform to the combination data D', the message "partial data M' is not correct data (failure in verification)" is displayed in a step S77.

As above, the verification data generation process (method) and the verification process (method) which are applicable to the embodiment have been explained.

<Example of Verification Result>

Hereinafter, the various verification results acquired when the verification data generation process and the verification process both explained above are applied will be explained as comparing the background art and the embodiment with each other, by way of concrete examples.

First, the examples in the case where the background art (U.S. Pat. No. 5,898,779) is applied to the system (FIG. 1) in the embodiment will be explained. In that case, when the region data is delivered by the server, the digital signature is generated for the region data (ROI) to be delivered, and the digital signature for the region data is delivered together with the relevant region data to the client. After then, the received region data is verified or authenticated in the client, whereby it is possible to verify whether or not the received region data has been altered in the track of the network.

Figure 10:
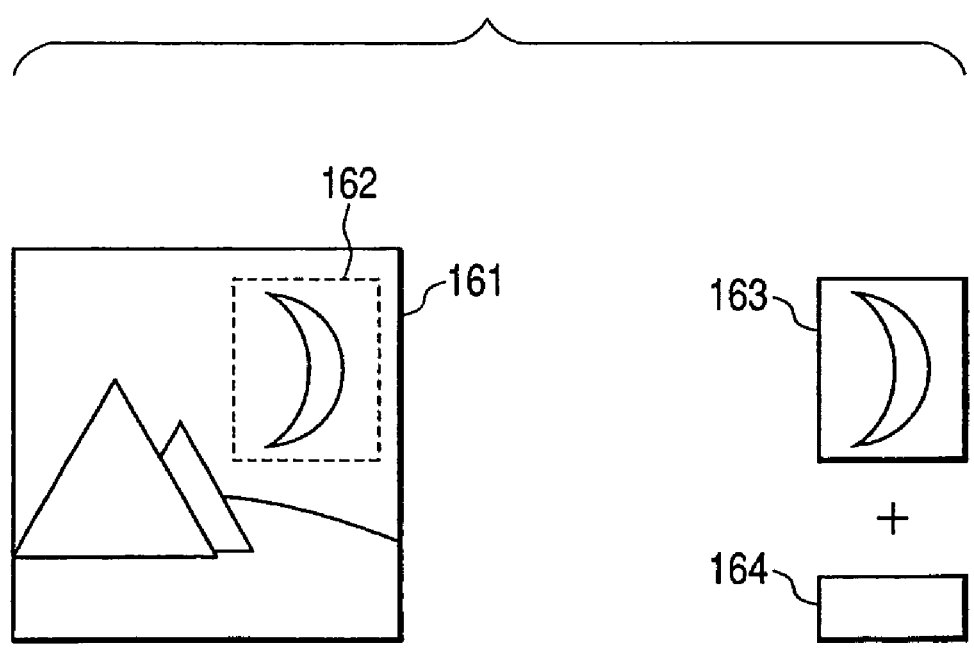
FIG. 10 is a process for explaining a digital signature generation process in the background art.

The concrete example thereof will be explained with reference to FIG. 10. In FIG. 10, numeral 161 denotes image data stored in the server, numeral 162 denotes a region requested by the client, numeral 163 denotes region data acquired by cutting out the region 162, and numeral 164 denotes a digital signature for the region data 163.

In a case where the delivery request of the region 162 included in the image data 161 is generated from the client to the server, the server cuts out the region 162 from the image data 161 to generate the region data 163, and also generates the digital signature 164 for the region data 163. Then, the generated region data 163 and the digital signature 164 thereof are delivered to the client. Thus, the client can verify, by using the digital signature 164, whether or not the received region data 163 has been altered in the track of the network.

Figure 11:
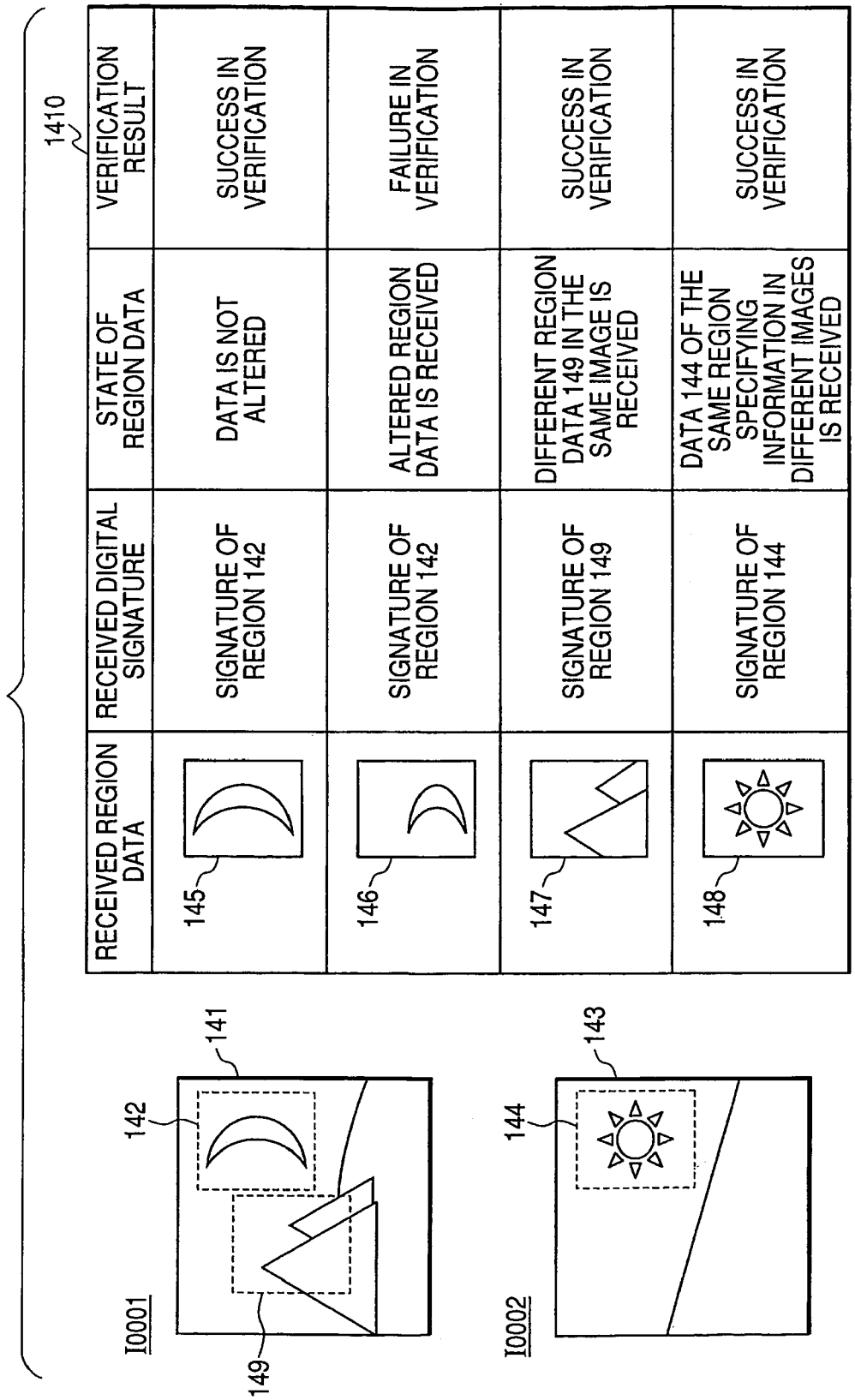
FIG. 11 is a diagram for explaining a verification result in the background art.

In any case, first, the example of the verification result according to the background art will be explained with reference to FIG. 11. In FIG. 11, numeral 141 denotes image data I0001 requested by the client, numeral 142 denotes a partial region in the image data I0001 requested by the client, numeral 143 denotes image data I0002 different from the image data I0001, numeral 144 denotes a region at the location, in the image data I0002, same as that of the partial region 142 in the image data I0001, and numeral 149 denotes a region at the location different from that of the partial region 142 in the image data I0001. Here, it is assumed that the image data I0001 and the image data I0002 are stored on the server.

First, in a table 1410, if the region 142 and the digital signature corresponding to the region 142 are received (data 145), it is possible to judge that the data is not altered (success in verification). Meanwhile, if the region 142 which is the altered data and the digital signature corresponding to the region 142 are received (data 146), it is possible to judge that the data has been altered (failure in verification).

On the other hand, if the region 149 and the digital signature corresponding to the region 149 are received although the region 142 was requested (data 147), it is judged that the data is not altered (success in verification). This is because, in the verification process, the received region 149 and the digital signature for the region 149 are not at all altered. That is, in that case, it is impossible to detect that the region 149 is received instead of the region 142.

Further, if the region 144 and the digital signature corresponding to the region 144 are received although the region 142 in the image data 141 was requested (data 148), it is judged that the data is not altered (success in verification). This is because, in the verification process, the received region 144 and the digital signature for the region 144 are not at all altered. That is, in that case, it is impossible to detect that the region 144 is received instead of the region 142.

As above, the examples of the verification results in the background art have been explained.

Figure 12:
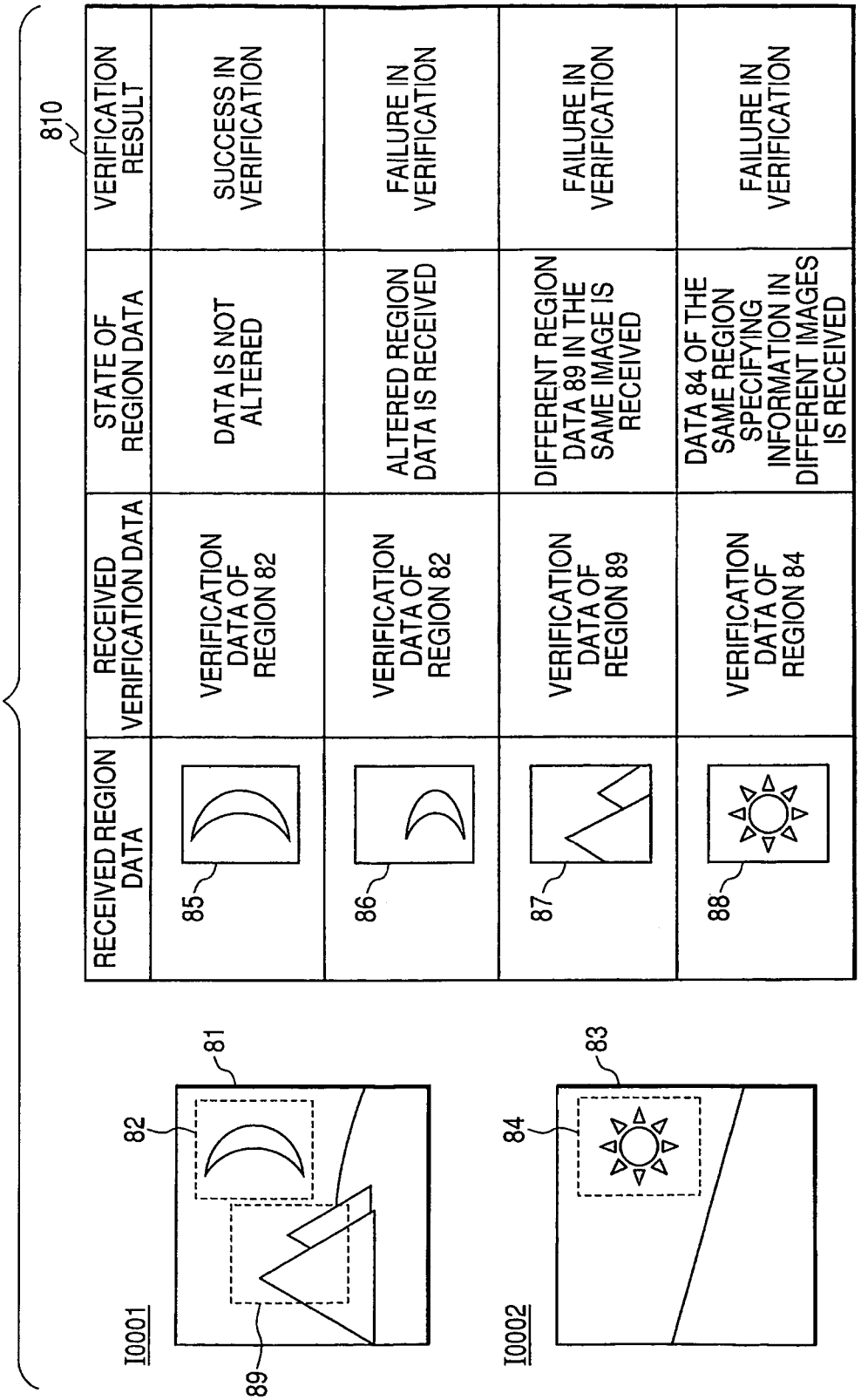
FIG. 12 is a diagram for explaining a verification result in the embodiment.

Subsequently, the examples of the verification results according to the embodiment will be explained with reference to FIG. 12. In FIG. 12, numeral 81 denotes whole image data (image discrimination information is I0001) designated by using the section 22 (FIG. 2) in the image reproduction client 11 (FIG. 1), and numeral 82 denotes partial data designated by using the region 25 (FIG. 2).

Further, numeral 89 denotes partial data, in the image data I0001, indicating the region different from the region 22 designated by the section 22. That is, the partial data 89 has image discrimination information ID same as that of the partial data 82 but has partial data specifying information Z' different from that of the partial data 82.

Furthermore, numeral 84 denotes partial data, in image data 83 (image discrimination information is I0002) different from the image data I0001, indicating the region same as the region 82 designated by the section 22 (that is, the upper left coordinates and the lower right coordinates are the same as those of the region 82). That is, the partial data 84 has image discrimination information ID' different from that of the partial data 82 but has the partial data specifying information Z same as that of the partial data 82.

A table 810 shows the actually received partial data and the respective verification results in the case where the image reproduction client 11 requests the partial data (partial data specifying information is Z) in the image data 81 (image discrimination information ID is I0001).

First, when the region 82 and the verification data corresponding to the region 82 are received (data 85), in FIG. 8, the image discrimination information ID, the partial data specifying information Z and the partial data M' are respectively equivalent to the image discrimination information ID, the partial data specifying information Z and the partial data M in the verification data D (FIG. 6), whereby D resultingly conforms to D'. In consequence, it is possible to judge that the received partial data M' is correct (success in verification).

Next, when the region 82 which is the altered image data and the verification data corresponding to the relevant region 82 are received (data 86), in FIG. 8, the image discrimination information ID and the partial data specifying information Z are respectively equivalent to the image discrimination information ID and the partial data specifying information Z in the verification data D (FIG. 6). Meanwhile, the partial data M' is different from the partial data M in the verification data D (FIG. 6), whereby D does not resultingly conform to D'. In consequence, it judged that the received partial data M' is not correct (failure in verification).

Further, when the region 89 and the verification data corresponding to the region 89 are received although the region 82 was requested (data 87), in FIG. 8, the image discrimination information ID and the partial data M' are respectively equivalent to the image discrimination information ID and the partial data M in the verification data D. Meanwhile, the partial data specifying information Z is different from the partial data specifying information Z in the verification data D. This is because, in that case, the partial data specifying information in the verification data D is not the information for specifying the region 82 but is the information for specifying the region 89. Thus, D does not resultingly conform to D'. In consequence, it is judged that the received partial data M' is not correct (failure in verification).

Furthermore, when the region 84 and the verification data corresponding to the region 84 are received although the region 82 was requested (data 88), in FIG. 8, the partial data specifying information Z and the partial data M' are respectively equivalent to the partial data specifying information Z and the partial data M in the verification data D. Meanwhile, the image discrimination information ID is different from the image discrimination information ID in the verification data. This is because, in that case, the image discrimination information ID in the verification data D is not the image data I0001 but is the image data I0002. Thus, D does not resultingly conform to D'. In consequence, it is judged that the received partial data M' is not correct (failure in verification).

As above, the verification data generation process and the verification results in the verification process in the embodiment have been explained.

Incidentally, it will be explained whether or not to be able to receive the partial data such as the data 86 to 88 explained above in what kind of attack was actually made on the network.

In the case where the partial data M' is delivered from the image delivery server 12 to the image reproduction client 11, the partial data such as the data 86 can be received if the partial data M' is altered in the track of the network by a malignant attacker.

On the other hand, in the case where the partial data is delivered at a certain time, the partial data such as the data 87 and the data 88 can be received if the partial data M' is falsely monitored by the malignant attacker and then the monitored partial data M' is sent to the image reproduction client 11 (so called resend attack).

Incidentally, in the embodiment, the example of the on-line that the server and the client are respectively disposed on the network is described for purposes of explanation. However, the present invention is not limited to this. That is, it is apparent that the present invention is applicable to a case of off-line that any server and client are not used. In case of the off-line, in order to be able to achieve the verification by using the verification method shown in FIG. 8, when the partial data M' is acquired, the image discrimination information ID, the partial data discrimination information Z and the verification data S corresponding to the partial data M' are simultaneously acquired, and these data are associated with others and stored. Then, when the verification is necessary, it only has to execute the verification process by using the method shown in FIG. 8.

<Modification 1>

In the embodiment, the partial data specifying information Z acquired by the partial data specifying information acquisition unit 32 (FIG. 4) and the partial data specifying information Z acquired by the partial data specifying information acquisition unit (FIG. 8) are the information for specifying the spatial partial region in the image data. However, the present invention is not limited to this. That is, it is apparent that various information data for specifying resolution, image quality, components and the like are applicable to the present invention if they are the information for specifying the partial data in the image data. Moreover, it is apparent that the data acquired by properly combined at least two or more of the information data from among the above information data is also applicable to the present invention.

Hereinafter, it is assumed that the resolution, the image quality and the component are combined in addition to the region and then the acquired combination is designated as the partial data specifying information Z. In such a case, the method of actually acquiring the partial data specifying information Z will be explained with reference to FIG. 13.

Figure 13:
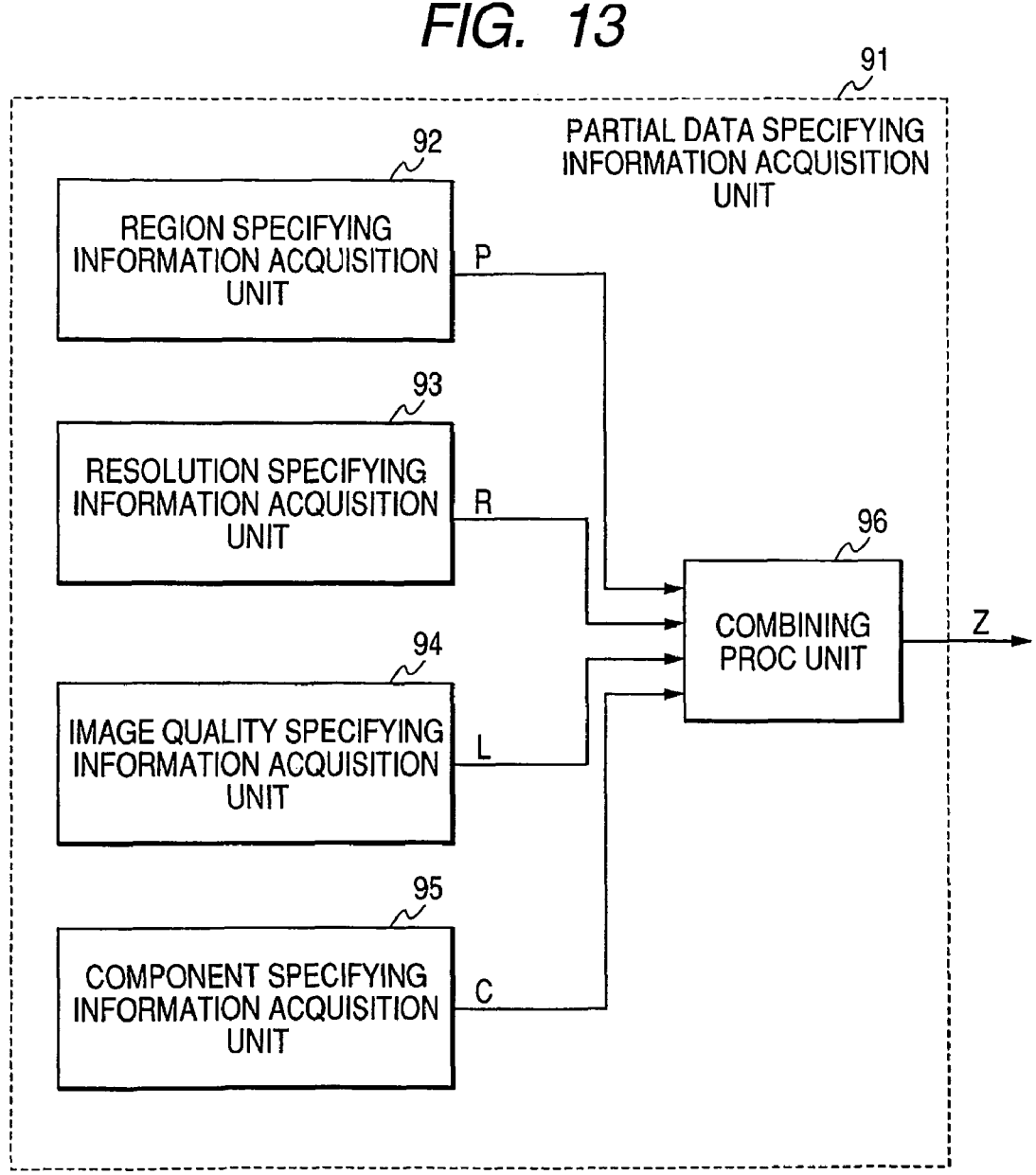
FIG. 13 is a block diagram showing the constitution of a partial data specifying information acquisition unit in the embodiment.

FIG. 13 is the block diagram for explaining the partial data specifying information acquisition unit (FIG. 4), and the partial data specifying information acquisition unit applied instead of the partial data specifying information acquisition unit 65 (FIG. 8).

In FIG. 13, a partial data specifying information acquisition unit 91 consists of a region specifying information acquisition unit 92, a resolution specifying information acquisition unit 93, an image quality specifying information acquisition unit 94, a component specifying information acquisition unit 95 and a combining processing unit 96.

First, as well as the partial data specifying information acquisition unit 32 (FIG. 4) and the partial data specifying information acquisition unit 65 (FIG. 8), the region specifying information acquisition unit 92 acquires the information for designating the spatial region in the image, and the resolution specifying information acquisition unit 93 acquires the information for designating the resolution of the image. For example, in JPEG (Joint Photographic Experts Group) 2000, the resolution specifying information acquisition unit 93 acquires the identifier of a predetermined resolution level. Moreover, the image quality specifying information acquisition unit 94 acquires the information for designating the image quality of the image. For example, in JPEG 2000, the image quality specifying information acquisition unit 94 acquires a predetermined layer. Further, the component specifying information acquisition unit 95 acquires the information for designating the component in the image. For example, in JPEG 2000, the component specifying information acquisition unit 95 acquires a luminance component and a predetermined color component.

Next, the combining processing unit 96 will be explained. That is, the combining processing unit 96 combines region specifying information P, resolution specifying information R, image quality specifying information L and component specifying information C which are respectively acquired by the region specifying information acquisition unit 92, the resolution specifying information acquisition unit 93, the image quality specifying information acquisition unit 94 and the component specifying information acquisition unit 95. Then, the combining processing unit 96 outputs the combination data as specifying information Z.

The partial data specifying information Z acquired from the partial data specifying information acquisition unit 91 is input to the combining processing unit 34 (FIG. 4) or the combining processing unit 67 (FIG. 8), and further combined with the image discrimination information ID and the partial data M (or M'), whereby the combination data D (or D') is generated. As a result, the combination data D (or D') as shown in FIG. 14 is acquired.

Figure 14:
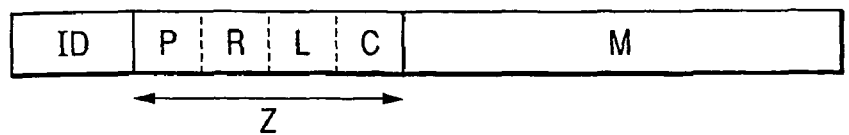
FIG. 14 is a diagram for explaining the combination data in the embodiment.

As shown in FIG. 14, if the information data (P, R, L and C) for specifying the plural partial data are designated, these data are all combined. Thus, it only has to set the acquired combination data as the partial data specifying information Z.

As described above, in the modification 1, the partial data specifying information can be represented by combining at least two or more information data. Incidentally, it is needless to say that the example capable of representing the partial data specifying information by appropriately combining at least two or more information data is not limited to this.

<Modification 2>

In the embodiment, the image data and the partial data thereof (region, resolution, image quality, component, and combination thereof) are explained as the target to be processed. However, the present invention is not limited to this. That is, it is apparent that the present invention is applicable to various data consisting of the plural partial data.

Here, a case where the present invention is applied to document data having the hierarchical constitution, such as XML (eXtensible Markup Language) data, PDF (Portable Document Format) data, etc. will be explained by way of example with reference to FIG. 15. As shown in FIG. 15, the document data in the embodiment consists of a "company information" component. Further, the "company information" component consists of one "company name" component and plural "company member information" components. Moreover, each "company member information" component consists of one "company member number" component, one "name" component, one "sexuality (gender)" component and one "in charge of" component.

In the document information as shown in FIG. 15, the document name (that is, the content of the "company name" component) for discriminating each document is used as document data discrimination information ID instead of image data discrimination information. Further, the content of the "company member number" component is used as the partial data specifying information Z, and the content of the "company member information" component is used as the partial data M.

According to the embodiment, it is possible to acquire the content of the desired "company member information" component by using the content of the "company member number" component from the document data held on the server, and it is then possible to verify whether or not the content of the acquired "company member information" component is correct information.

Besides, a case where the present invention is applied to database information will be explained by way of another example with reference to FIGS. 16A and 16B. As shown in FIGS. 16A and 16B, the database information in the embodiment is the aggregation of the company member information (record) consisting of "company member number", "name", "sexuality" and "in charge of".

In the database information as shown in FIG. 16, the database name for discriminating each database information is used as database discrimination information ID instead of the image data discrimination information. Further, each "company member number" is used as the partial data specifying information Z, and each "company member information" is used as the partial data M.

According to the embodiment, in a case where the desired company member information (i.e., partial data M) is acquired from the database information (i.e., company discrimination information ID) of a company A by using the company member number (i.e., partial data specifying information Z), it is possible to verify whether or not the acquired company member information is correct company member information.

Incidentally, in the embodiment, the partial data specifying information Z is included in the partial data M. However, the present invention is not limited to this. That is, it is possible to set the partial data M not to include the partial data specifying information Z. In this case, it only has to set the data acquired by eliminating the partial data specifying information Z from the desired partial data as the partial data M.

Subsequently, a case where, even if the identical database information is used, it is possible to appropriately set the database discrimination information ID and the partial data specifying information Z will be explained.

In FIGS. 16A and 16B, with respect to the database for the company YYY, the database information discrimination information ID can be set to be "company member number is 000002 and name" as the partial data specifying information Z by using the URL, and the partial data M of the partial data specifying information Z can be set to be "DDD". As above, it is possible to generate the verification data according to the target that the data generation side wishes to verify. Moreover, if the rule concerning how the database discrimination information ID and the partial data specifying information Z should be set is shared in secret by both the data generation side and the data verification side, it becomes further difficult to alter the data.

<Modification 3>

In the present invention, as explained above, the device for encrypting (encoding) and decrypting (decoding) the image data is the multipurpose information processing device such as an ordinary personal computer or the like, and the present invention can be achieved by the computer program running on the ordinary personal computer. For this reason, it is apparent that the category of the present invention includes the relevant computer program. Besides, the computer program has been ordinarily stored in a computer-readable storage medium such as a CD-ROM or the like, and the present invention can be achieved by copying or installing the relevant program on the storage medium to the system of the ordinary personal computer. For this reason, it is also apparent that the category of the present invention naturally includes the relevant computer-readable storage medium.

As explained above, according to the embodiment, it is possible to verify whether or not the region data included in the image data has been altered. In addition, it is possible to verify that the region data is the region data included in the original image data different from the authentic original image data, and/or to verify that the region data is the different region data included in the authentic original data.

In other words, the foregoing description of the embodiments has been given for illustrative purposes only and not to be construed as imposing any limitation in every respect.

The scope of the present invention is, therefore, to be determined solely by the following claims and not limited by the text of the specification and alterations made within a scope equivalent to the scope of the claims fall within the true spirit and scope of the present invention.

This application claims priority from Japanese Patent Application No. 2005-033016 filed Feb. 9, 2005, which is hereby incorporated by reference herein.

The invention claimed is:

1. An information processing method comprising:
 a discrimination information acquisition step of acquiring digital data discrimination information for discriminating digital data from a plurality of digital data;
 a specifying information acquisition step of acquiring specifying information for specifying partial data included in the discriminated digital data;
 a partial data acquisition step of acquiring, from the discriminated digital data, the partial data corresponding to the specifying information for specifying partial data;
 a combined data generation step of generating combined data including the digital data discrimination information, the specifying information for specifying partial data, and the partial data;
 a cryptographic key information acquisition step of acquiring cryptographic key information for generating verification data;
 a verification data generation step of generating verification data, to verify whether or not the specified partial data is altered, from the combined data generated in said combined data generation step, based on the cryptographic key information acquired in said cryptographic key information acquisition step, wherein the verification data is either a MAC (message authentication) or a digital signature; and
 an output step of outputting the partial data and the verification data.

2. An information processing method according to claim 1, wherein
 the digital data is image data, and
 the specifying information of the partial data is information for specifying a region, resolution, image quality, a component or a combination thereof included in the image data.

3. An information processing method according to claim 1, wherein
 the digital data is document data consisting of plural element contents,
 the specifying information of the partial data is information for specifying the element content included in the document data, and
 the partial data represents the element content included in the document data.

4. An information processing method according to claim 1, wherein
 the digital data is database information,
 the specifying information of the partial data is information for specifying a record included in the database information, and
 the partial data represents a record included in the database information.

5. An information processing method according to claim 1, further comprising:
 a verification data acquisition step of acquiring verification data; and
 a verification step of verifying whether or not a relationship between the partial data and the digital data is correct, using the verification data acquired in said verification data acquisition step and the verification data generated in said verification data generation step.

6. An information processing device comprising:

a discrimination information acquisition unit configured to acquire digital data discrimination information for discriminating digital data from a plurality of digital data;

a specifying information acquisition unit configured to acquire specifying information for specifying partial data included in the discriminated digital data;

a partial data acquisition unit configured to acquire, from the discriminated digital data, the partial data corresponding to the specifying information for specifying partial data;

a combined data generation unit configured to generate combined data including the digital data discrimination information, the specifying information for specifying partial data, and the partial data;

a cryptographic key information acquisition unit configured to acquire cryptographic key information for generating verification data;

a verification data generation unit configured to generate verification data, to verify whether or not the specified partial data is altered, from the combined data generated by said combined data generation unit, based on the cryptographic key information acquired by said cryptographic key information acquisition unit, wherein the verification data is either a MAC (message authentication) or a digital signature; and an output unit configured to output the partial data and the verification data.

7. An information processing device according to claim 6, comprising:

a verification data acquisition unit configured to acquire verification data; and a verification unit configured to verify whether or not a relationship between the partial data and the digital data is correct, using the verification data acquired by said verification data acquisition unit and the verification data generated by said verification data generation unit.

8. A computer program, embodied in a non-transitory computer-readable storage medium, which is used to execute the information processing method as described in claim 1.

9. A non-transitory computer-readable storage medium which stores a computer program for executing the information processing method as described in claim 1.

* * * * *